(12) United States Patent
Urbinati et al.

(10) Patent No.: US 10,577,088 B2
(45) Date of Patent: Mar. 3, 2020

(54) AIRCRAFT LANDING GEAR SHOCK ABSORBING STRUT

(71) Applicant: Safran Landing Systems UK LTD, Gloucester (GB)

(72) Inventors: Simone Urbinati, Gloucester (GB); Matt Hilliard, Gloucester (GB); Jon Smith, Gloucester (GB)

(73) Assignee: SAFRAN LANDING SYSTEMS UK LTD (GB)

( * ) Notice: Subject to any disclaimer, the term of this patent is extended or adjusted under 35 U.S.C. 154(b) by 0 days.

(21) Appl. No.: 15/955,921

(22) Filed: Apr. 18, 2018

(65) Prior Publication Data

US 2018/0305001 A1 Oct. 25, 2018

(30) Foreign Application Priority Data

Apr. 20, 2017 (EP) .................................. 17167424

(51) Int. Cl.
*B64C 25/60* (2006.01)
*F16F 9/06* (2006.01)
*B64C 25/00* (2006.01)

(52) U.S. Cl.
CPC .............. *B64C 25/60* (2013.01); *F16F 9/062* (2013.01); *F16F 9/063* (2013.01);
(Continued)

(58) Field of Classification Search
CPC .. F16F 9/062; F16F 9/063; F16F 9/088; F16F 9/092; B64C 25/60
(Continued)

(56) References Cited

U.S. PATENT DOCUMENTS 3,290,037 A * 12/1966 Williams ................ B64C 25/60
244/104 R
3,970,292 A 7/1976 Dachicourt et al.
(Continued)

FOREIGN PATENT DOCUMENTS

CA 2028468 A1 4/1992
DE 2511289 A1 9/1975
(Continued)

OTHER PUBLICATIONS

European Search Report for European Application No. 17167424.5, dated Oct. 24, 2017—10 pages.

*Primary Examiner* — Thomas J Williams
(74) *Attorney, Agent, or Firm* — RatnerPrestia

(57) ABSTRACT

An aircraft landing gear shock absorbing strut having an outer cylinder and a sliding tube coupled within the cylinder bore to move between compressed and extended conditions. The cylinder and tube define a variable-volume internal chamber. The internal chamber is divided into a first spring chamber and a second spring chamber. The first spring chamber is a pneumatic chamber containing a first gas that is compressed when the strut moves from the extended condition to the compressed condition to provide compression damping. The second spring chamber contains a second gas and a hydraulic liquid, and is configured to compress the second gas when the strut moves from the extended condition to the compressed condition. The second spring chamber contains one or more damping orifices through which the oil passes as the strut extends to provide recoil damping during extension of the strut.

13 Claims, 3 Drawing Sheets

(52) U.S. Cl.
CPC ..... *B64C 2025/008* (2013.01); *F16F 2222/12* (2013.01); *F16F 2232/08* (2013.01); *F16F 2234/02* (2013.01); *F16F 2236/045* (2013.01)

(58) Field of Classification Search
USPC ........................................ 267/64.26; 188/297
See application file for complete search history.

(56) References Cited

U.S. PATENT DOCUMENTS

| | | | | |
|---|---|---|---|---|
| 4,749,152 | A * | 6/1988 | Veaux | B64C 25/60 188/321.11 |
| 4,995,597 | A * | 2/1991 | Hatton | B64C 25/60 188/269 |
| 2010/0187353 | A1* | 7/2010 | Masson | B64C 25/60 244/104 FP |
| 2016/0272309 | A1* | 9/2016 | Schmidt | F16F 9/062 |

FOREIGN PATENT DOCUMENTS

| | | |
|---|---|---|
| DE | 4116030 C1 | 9/1992 |
| DE | 4116399 A1 | 11/1992 |
| FR | 2340482 A1 | 9/1977 |
| GB | 562677 | 7/1944 |
| NL | 61403 C | 7/1948 |

\* cited by examiner

AIRCRAFT LANDING GEAR SHOCK ABSORBING STRUT

This application claims the benefit of and priority to European Application No. 17167424.5, filed on Apr. 20, 2017, the contents of which are incorporated herein by reference.

BACKGROUND

An oleo-pneumatic shock absorbing strut is a known type of shock absorbing strut used in aircraft landing gear. Such a shock absorbing strut typically includes an outer cylinder which defines an inner bore in which a sliding tube is slidably mounted such that the outer cylinder and sliding tube together define a variable sized internal chamber. The chamber contains oil and a gas, such as nitrogen. When the shock absorber is compressed, the chamber volume decreases, compressing the gas and forcing oil through a first damping orifice in order to provide compression damping. The compressed gas serves as a spring, biasing the shock absorber to extend following removal of the compressive force. Recoil damping is provided by the oil passing through a second damping orifice, which can be in the shock absorber annulus.

The oil within an oleo-pneumatic shock absorber is also used for lubrication of the internal sliding surfaces (bearings) between the sliding tube and outer cylinder.

The present inventors have identified that conventional oleo-pneumatic shock absorbing struts can be reduced in weight.

SUMMARY

In accordance with a first aspect of the invention, there is provided an aircraft landing gear shock absorbing strut having: an outer cylinder defining a bore; a sliding tube slidably coupled within the bore to move between a first position, which corresponds to the shock absorbing strut being in a compressed condition, and a second position, which corresponds to the shock absorbing strut being in an extended condition, the outer cylinder and sliding tube together defining an internal chamber that varies in volume in accordance with the extension state of the shock absorbing strut. The shock absorbing strut is arranged to divide the internal chamber into a first spring chamber and a second spring chamber. The first spring chamber is a pneumatic chamber containing a first gas. The first spring chamber is arranged to force the first gas through a flow restrictor when the shock absorbing strut moves from the extended condition to the compressed condition to provide compression damping to the shock absorbing strut. The second spring chamber contains a second gas and a hydraulic liquid. The second spring chamber is arranged to compress the second gas when the shock absorbing strut moves from the extended condition to the compressed condition. The second spring chamber contains one or more damping orifices through which the oil passes as the shock absorbing strut extends to provide recoil damping during extension of the shock absorbing strut.

Thus, an aircraft landing gear shock absorber strut according to the first aspect can contain two separate spring chambers which work in parallel to provide the shock absorber spring function. The first chamber is a pneumatic chamber which provides compression damping for the landing gear strut. The second spring chamber provides recoil damping and also lubricates the shock absorbing strut. This arrangement allows for a significant reduction in oil weight due to the separation of the compression and extension damping.

The first and second spring chambers may be isolated from fluid communication with one another.

The first and second spring chambers may operate in parallel.

The second spring chamber may be at least partially defined by an annulus between the outer cylinder and sliding tube, the annulus containing one or more bearings each mounted on one of the outer cylinder and sliding tube to move in sliding engagement with the other, such that the hydraulic liquid within the second spring chamber lubricates the one or more bearings as the shock absorbing strut moves between the compressed condition and the extended condition.

The first spring chamber may have a variable volume sub-chamber in fluid communication with a fixed volume sub-chamber via the flow restrictor, to provide compression damping to the shock absorbing strut as gas is forced into the fixed volume sub-chamber from the variable volume sub-chamber during compression of the shock absorbing strut. The shock absorbing strut may further include an end fitting arranged to close the distal end of the outer cylinder relative to the end from which the sliding tube projects, the end fitting extending into the bore to define a piston which moves in sealing engagement with an inner sidewall of the sliding tube to define the variable volume sub-chamber of the first spring chamber. The sliding tube may include a radially inwardly extending neck portion connected to an open end of an inner tube the distal end of which is closed or arranged to be closed, the fixed volume sub-chamber of the first spring chamber being defined by the inner tube. The piston may include a port in fluid communication with open end of an inner tube the distal end of which is closed or arranged to be closed, the fixed volume sub-chamber of the first spring chamber being defined by the inner tube. The inner tube may be an inflation tube.

The shock absorbing strut may be coupled to a mounting bearing via which the shock absorbing strut is arranged to be pivotally coupled to an aircraft and further being coupled to a wheel assembly for supporting the aircraft on the ground.

According to a second aspect of the invention there is provided an aircraft including one or more aircraft landing gear, each landing gear including a shock absorbing strut according to the first aspect.

DETAILED DESCRIPTION

Figure 1:
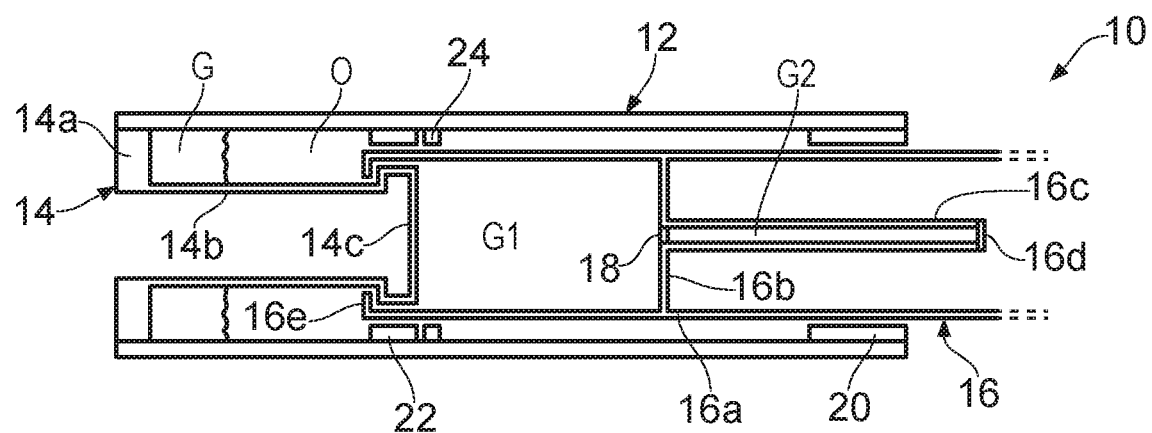
FIG. 1 is a schematic cross section view of an aircraft landing gear shock absorbing strut according to an embodiment of the invention in an extended state.
Figure 2:
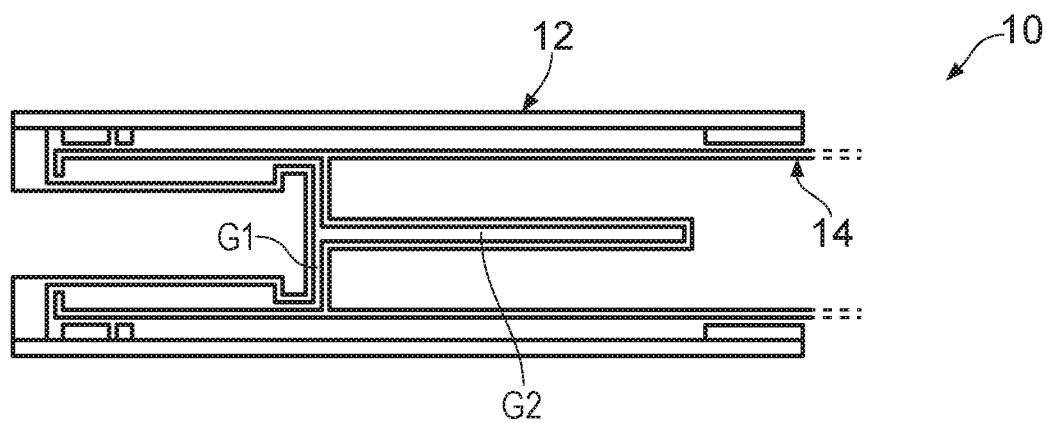
FIG. 2 is a schematic cross section view of the shock absorbing strut of FIG. 1 in a compressed condition.

FIGS. 1 and 2 are a schematic cross section views of part of an aircraft, more specifically an aircraft landing gear assembly, according to an embodiment of the invention. FIGS. 1 and 2 focus on the shock absorbing strut 10 of the landing gear assembly.

The shock absorbing strut 10 comprises an outer cylinder 12 which can include a bearing formation (not shown) by which it is arranged to be pivotally coupled to an aircraft so as to define the landing gear main fitting. Alternatively, the shock absorber can form part of a capsule type shock absorbing strut.

At one end, which corresponds to its upper end when in a deployed landing gear condition, the outer cylinder 12 is closed by an end fitting 14 which comprises a radial cap portion 14a which extends inwardly from the outer cylinder 12 and connects to a cylindrical section 14b which extends into the bore of the outer cylinder 12 before terminating in a radially enlarged piston 14c. The end fitting 14 provides a substantially fluid tight seal between itself and the outer cylinder so as to close the end of the outer cylinder 12.

A sliding tube 16 is slidably coupled within the outer cylinder 12 so as to be reversibly movable along the longitudinal axis of the outer cylinder 12 between a first position, shown in FIG. 2, which corresponds to a contracted position for the shock absorber, and a second position, shown in FIG. 1, which corresponds to an extended condition of the shock absorbing strut.

The sliding tube 16 has a cylindrical sidewall 16a which extends through a lower bearing and dynamic seal assembly 20 mounted at the second, open, end of the outer cylinder 12. The end of the cylindrical sliding tube sidewall 16a which resides within the bore of the outer cylinder 12 includes a radially inwardly extending end stop formation 16e arranged to engage the piston 14c of the end fitting 14 to limit outward movement of the sliding tube 16. Alternatively or in addition, conventional end stops (not shown) can be provided between the sliding tube 16 and lower bearing assembly 20. Adjacent to the end stop 16e is a conventional shock absorber upper bearing assembly 22 for sliding contact with the inner surface of the outer cylinder 12.

The piston 14c moves in sealing sliding engagement with the inner wall of the sliding tube cylindrical body portion 16a. As such, the piston 14c divides the internal chamber of the oleo-pneumatic shock absorbing strut 10 into two separate spring chambers S1, S2, as illustrated in FIGS. 3 to 6.

The inner sidewall of the sliding tube 16 includes a radially inwardly extending neck region 16b which along with the piston 14c defines a variable volume gas sub chamber G1. The radially inwardly extending neck region 16b connects to an open end of an inner cylindrical tube 16c, the distal end of which is closed by a valve or cap to define a fixed volume gas sub chamber G2. A flow restrictor 18 is provided at the opening of the inner tube 16c to restrict the flow of gas between the variable volume gas sub chamber G1 and the fixed volume gas sub chamber G2. The flow restrictor 18 comprises one or more gas orifices and can include one or more check valves which permits gas to pass from the variable volume gas sub chamber G1 to the fixed volume gas sub chamber G2, but inhibits reverse flow.

The end of the sliding tube 16 which projects from the outer cylinder 12 can include a wheel assembly mounting formation, such as a bogie beam attachment yoke.

Figure 3:
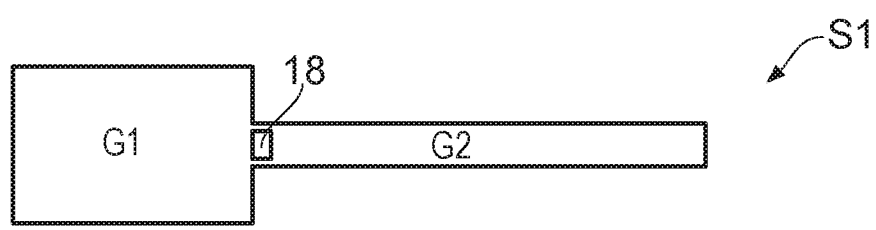
FIG. 3 is an illustration of the first spring chamber within the shock absorbing strut of FIG. 1 when in an extended condition.
Figure 4:
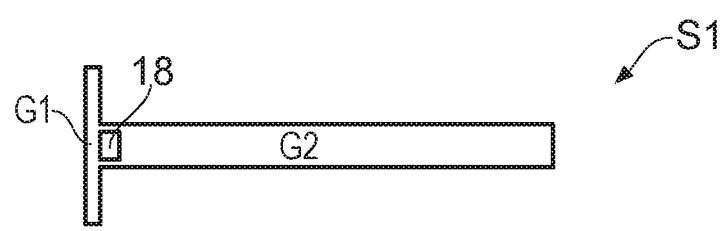
FIG. 4 is an illustration of the first spring chamber within the shock absorbing strut of FIG. 1 when in a compressed condition.

FIG. 3 schematically illustrates the first spring chamber, which is exclusively a gas chamber, when the shock absorber is in the extended condition shown in FIG. 1. The variable size gas chamber G1 is at its largest volume. As the shock absorber moves to the contracted condition, as shown in FIG. 2, the volume of the variable size gas chamber G1 decreases, thereby forcing gas within it through the flow restrictor 18 into the high pressure, fixed volume, gas chamber G2. As will be appreciated, the flow of gas from the variable volume gas sub chamber G1 to the fixed volume gas sub chamber G2 during shock absorber contraction creates a pressure differential across the flow restrictor 18 which provide compression damping for the shock absorber strut 10. Thereafter, the compressed gas within the reduced volume first spring chamber S1 serves to bias the shock absorber strut 10 to assume the extended condition.

Figure 5:
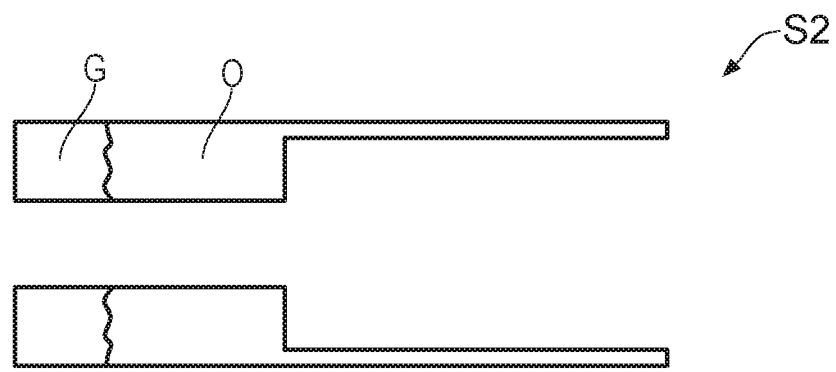
FIG. 5 is a schematic illustration of the second spring chamber within the shock absorber of FIG. 1 when in an extended condition.
Figure 6:
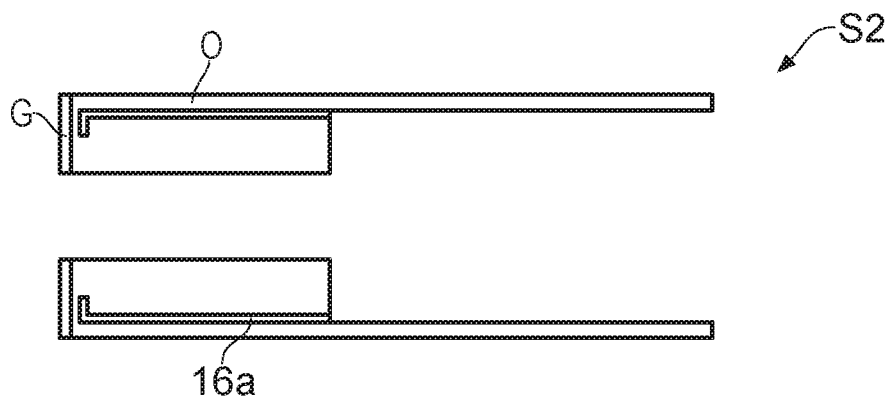
FIG. 6 is a schematic illustration of the second spring chamber within the shock absorber of FIG. 1 when in a compressed condition

The second spring chamber S2 is illustrated in FIGS. 5 and 6 and is defined by the annular space between the outer cylinder 12 and the cylindrical side wall of the sliding tube 16a and end fitting 14b. The second spring chamber S2 contains a mixture of hydraulic fluid, such as oil, O and a gas, such as nitrogen, G. The oil O and gas G are not separated in this embodiment. As the shock absorbing strut 10 is compressed, the gas is compressed as illustrated in FIG. 6. As the shock absorber extends, the oil O provides damping in a conventional manner as it passes through a 'flapper' type valve 24 located adjacent to the upper bearing 22. The 'flapper' valve 24 opens to provide free flow during shock absorber compression but closes to provide positively controlled damping during shock absorber extension.

The inner tube 16c of the sliding tube 16 can be an inflation tube, provided for inflating the shock absorber 10 following assembly.

Figure 7:
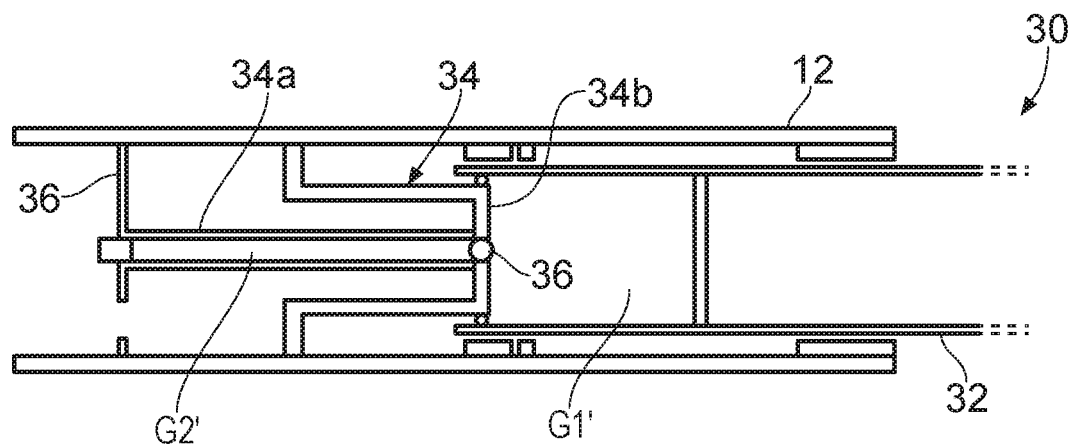
FIG. 7 is a schematic cross section view of an aircraft landing gear shock absorbing strut according to an embodiment of the invention in an extended state.
Figure 8:
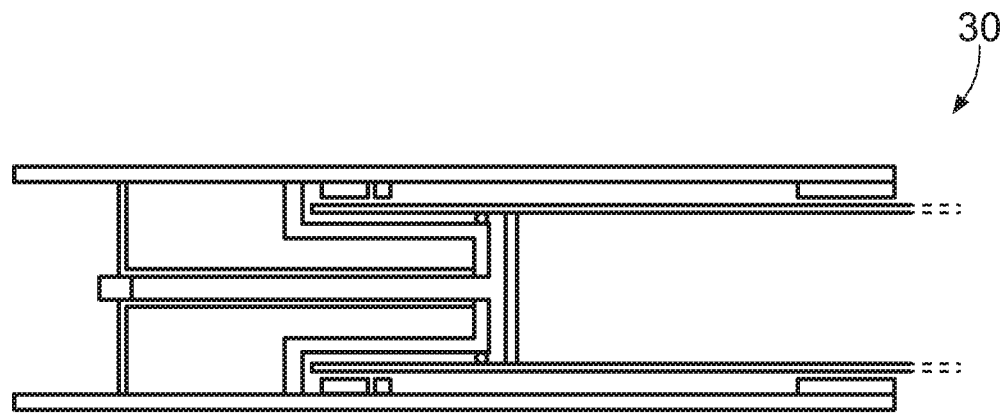
FIG. 8 is a schematic cross section view of the shock absorbing strut of FIG. 7 in a compressed condition.

FIG. 7 shows a shock absorbing strut according to a further embodiment of the invention generally at 30. The shock absorbing strut 30 is similar to the shock absorbing strut 10 of FIG. 1 and for brevity the following description will focus on the differences.

In the illustrated embodiment, the inner tube 34a which defines the fixed volume, second gas sub chamber G2' extends from the piston 34b of the end fitting 34. A distal, free end of the inner tube 34a can be positionally secured via a stabilising cross member 36. As with the previous embodiment, the variable volume, first gas chamber G1' is defined between the sliding tube 32 and the piston 34b.

The shock absorbing strut of the illustrated embodiment works in an analogous manner to the shock absorbing strut 10 described with reference to FIG. 1 in that gas within the variable volume sub chamber G1' is forced into the fixed volume, second sub chamber G2' via a flow restrictor 36 located at the port between the gas chambers G1' G2'.

Thus, an aircraft landing gear shock absorber strut according to embodiments of the invention contains two separate spring chambers S1, S2 which work in parallel to provide the shock absorber spring function. The first chamber S1 is a pneumatic chamber which provides compression damping for the landing gear strut. The second spring chamber located in the annulus between the outer cylinder 12 and sliding tube 16 provides recoil damping and also lubricates the shock absorbing strut. This arrangement allows for a significant reduction in oil weight due to the separation of the compression and extension damping. The first and second chambers can be set with different pressures acting on different areas.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. An aircraft landing gear shock absorbing strut comprising:
   an outer cylinder defining a bore;
   a sliding tube slidably coupled within the bore to move between a first position, which corresponds to the shock absorbing strut being in a compressed condition, and a second position, which corresponds to the shock absorbing strut being in an extended condition, the outer cylinder and sliding tube together defining an internal chamber that varies in volume in accordance with the extension state of the shock absorbing strut,
   wherein the shock absorbing strut is arranged to divide the internal chamber into a first spring chamber and a second spring chamber,
   the first spring chamber being a pneumatic chamber containing a first gas, the first spring chamber being arranged to force the first gas through a flow restrictor when the shock absorbing strut moves from the extended condition to the compressed condition to provide compression damping to the shock absorbing strut,
   the second spring chamber containing a second gas and a hydraulic liquid, the second spring chamber being arranged to compress the second gas when the shock absorbing strut moves from the extended condition to the compressed condition, the second spring chamber containing one or more damping orifices through which the oil passes as the shock absorbing strut extends to provide recoil damping during extension of the shock absorbing strut;
   wherein the first spring chamber comprises a variable volume sub-chamber in fluid communication with a fixed volume sub-chamber via the flow restrictor, to provide compression damping to the shock absorbing strut as gas is forced into the fixed volume sub-chamber from the variable volume sub-chamber during compression of the shock absorbing strut;
   wherein the aircraft landing gear shock absorbing strut further comprises an end fitting arranged to close a distal end of the outer cylinder, the distal end of the outer cylinder being opposite an end of the outer cylinder from which the sliding tube projects, the end fitting extending into the bore to define a piston which moves in sealing engagement with an inner sidewall of the sliding tube to define the variable volume sub-chamber of the first spring chamber, and
   wherein the sliding tube includes a radially inwardly extending neck portion connected to an open end of an inner tube defining the fixed volume sub-chamber of the first spring chamber, the inner tube extending from the flow restrictor at a proximal end of the inner tube to a distal end of the inner tube, the distal end of the inner tube being closed or arranged to be closed.

2. The aircraft landing gear shock absorbing strut according to claim 1, wherein the first and second spring chambers are isolated from fluid communication with one another.

3. The aircraft landing gear shock absorbing strut according to claim 1, wherein the first and second spring chambers operate in parallel.

4. The aircraft landing gear shock absorbing strut according to claim 1, wherein the second spring chamber is at least partially defined by an annulus between the outer cylinder and sliding tube, the annulus containing one or more bearings each mounted on one of the outer cylinder and sliding tube to move in sliding engagement with the other, such that the hydraulic liquid within the second spring chamber lubricates the one or more bearings as the shock absorbing strut moves between the compressed condition and the extended condition.

5. The aircraft landing gear shock absorbing strut according to claim 1, wherein the piston includes a port in fluid communication with the proximal end of the inner tube.

6. The aircraft landing gear shock absorbing strut according to claim 1, wherein the inner tube comprises an inflation tube.

7. An aircraft landing gear assembly comprising a shock absorbing strut according to claim 1, the shock absorbing strut being coupled to a mounting bearing via which the shock absorbing strut is arranged to be pivotally coupled to an aircraft and further being coupled to a wheel assembly for supporting the aircraft on the ground.

8. An aircraft including one or more aircraft landing gear assemblies according to claim 7.

9. The aircraft landing gear shock absorbing strut according to claim 1, wherein at least a portion of at least one wall defining the first spring chamber is fixed relative to the outer cylinder.

10. An aircraft landing gear shock absorbing strut according to claim 1, wherein the flow restrictor comprises more than one orifice.

11. An aircraft landing gear shock absorbing strut according to claim 1, wherein the flow restrictor comprises a check valve.

12. An aircraft landing gear shock absorbing strut according to claim 1, wherein the compression damping and the recoil damping are different.

13. An aircraft landing gear shock absorbing strut comprising:
   an outer cylinder defining a bore;
   a sliding tube slidably coupled within the bore to move between a first position, which corresponds to the shock absorbing strut being in a compressed condition, and a second position, which corresponds to the shock absorbing strut being in an extended condition, the outer cylinder and sliding tube together defining an internal chamber that varies in volume in accordance with the extension state of the shock absorbing strut,
   wherein the shock absorbing strut is arranged to divide the internal chamber into a first spring chamber and a second spring chamber,
   wherein the first spring chamber comprises a pneumatic chamber containing a first gas, the first spring chamber being arranged to force the first gas through a flow restrictor when the shock absorbing strut moves from the extended condition to the compressed condition to provide compression damping to the shock absorbing strut,
   wherein the second spring chamber contains a second gas and a hydraulic liquid, the second spring chamber being arranged to compress the second gas when the shock absorbing strut moves from the extended condition to the compressed condition, the second spring chamber containing one or more damping orifices through which the oil passes as the shock absorbing strut extends to provide recoil damping during extension of the shock absorbing strut; and wherein the first spring chamber comprises a fixed size portion and a variable size portion, the fixed size portion being narrower than the variable size portion.

* * * * *